United States Patent
Lappas et al.

(10) Patent No.: US 9,607,267 B2
(45) Date of Patent: Mar. 28, 2017

(54) SYSTEM AND METHOD FOR MINING TAGS USING SOCIAL ENDORSEMENT NETWORKS

(71) Applicant: EXCALIBUR IP, LLC, Sunnyvale, CA (US)

(72) Inventors: Theodoros Lappas, Riverside, CA (US); Kunal Punera, Santa Clara, CA (US); Tamas Sarlos, Sunnyvale, CA (US)

(73) Assignee: EXCALIBUR IP, LLC, Sunnvale, CA (US)

( * ) Notice: Subject to any disclaimer, the term of this patent is extended or adjusted under 35 U.S.C. 154(b) by 0 days.

(21) Appl. No.: 14/136,477

(22) Filed: Dec. 20, 2013

(65) Prior Publication Data
US 2014/0108327 A1    Apr. 17, 2014

Related U.S. Application Data

(63) Continuation of application No. 13/090,194, filed on Apr. 19, 2011, now Pat. No. 8,666,927.

(51) Int. Cl.
*G06F 9/44*   (2006.01)
*G06N 7/02*   (2006.01)
*G06N 7/00*   (2006.01)
*G06Q 10/00*  (2012.01)

(52) U.S. Cl.
CPC ............. *G06N 7/005* (2013.01); *G06Q 10/00* (2013.01)

(58) Field of Classification Search
None
See application file for complete search history.

(56) References Cited

U.S. PATENT DOCUMENTS

2009/0094231 A1*  4/2009  Marvit et al. ................ 707/5
2011/0302124 A1* 12/2011  Cai et al. ................... 706/52

* cited by examiner

*Primary Examiner* — Li-Wu Chang
(74) *Attorney, Agent, or Firm* — James J. DeCarlo; Greenberg Traurig, LLP (57) ABSTRACT

Descriptive data relating to at least a subset of a plurality of entities on a website is retrieved over a network. Endorsement data relating to the plurality of entities is retrieved from the website. A first set of probabilities is determined reflecting a probability that endorsements can be attributed to specific aspects. A second set of probabilities is determined reflecting a probability that terms can be attributed to aspects. Using the first set of probabilities and the second set of probabilities, a subset of the terms that are most probably associated with each entity are selected. Tags are then generated for each entity using the selected terms.

20 Claims, 3 Drawing Sheets

SYSTEM AND METHOD FOR MINING TAGS USING SOCIAL ENDORSEMENT NETWORKS

CROSS REFERENCE TO RELATED APPLICATIONS

This application is a continuation of, and claims priority from co-pending U.S. patent application Ser. No. 13/090,194, filed on Apr. 19, 2011, entitled SYSTEM AND METHOD FOR MINING TAGS USING ENDORSEMENT NETWORKS, which is incorporated herein by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for automatically generating tags for online content, and more particularly, to using social endorsement networks to generate tags for online content.

BACKGROUND

The activity of users on many social networking platforms largely comprises their interaction with different types of entities. For example, users follow other users (e.g. celebrities) on TWITTER or tag and comment on photos on FLICKR and FACEBOOK. These entities are at the core of many applications; they can be ranked in search results, recommended to users, or used in contextual advertising. Such applications assume knowledge of an entity's nature and characteristic attributes. An effective way to encode such knowledge is in the form of tags. An untagged entity is practically inaccessible, since it is hard to retrieve or interact with. Some platforms allow users to manually tag entities. However, even though such tags can be informative, they can oftentimes be inadequate, trivial or ambiguous. Numerous automated tagging methods have been proposed to address these issues. However, most of them require pre-existing high-quality tags or descriptive texts for every entity that needs to be tagged.

SUMMARY OF THE INVENTION

In one embodiment, the invention is a method. Descriptive data relating to at least a subset of a plurality of entities on a website is retrieved over a network. The descriptive data comprises a plurality of descriptive data entries, each descriptive data entry relating to a respective one of the subset of the plurality of entities. Endorsement data relating to the plurality of entities is retrieved, over the network, from the website. The endorsement data comprises a plurality of endorsements, each endorsement relating to a respective one of the plurality of entities and a respective one of a plurality of users. Using the descriptive data and the endorsement data, a first set of probabilities are determined using the computing device. Each of the first set of probabilities reflects a probability that a respective one of the plurality of endorsements can be attributed to a respective one of a plurality of aspects. Each of the plurality of aspects represents a cluster of entities. Using the descriptive data and the endorsement data, a second set of probabilities are determined using the computing device. Each of the second set of probabilities reflects a probability that a respective one of a plurality of terms can be attributed to a respective one of the plurality of aspects. Using the first set of probabilities and the second set of probabilities, for each entity, a respective subset of the plurality of terms that are most probably associated with the respective entity are selected using the computing device. Tags are then generated, for each entity, using the respective subset of the plurality of terms that are most probably associated with the respective entity.

In one embodiment, the invention is a system comprising a processor and a storage medium for tangibly storing thereon program logic for execution by the processor. The program logic comprises: descriptive data retrieving logic for retrieving descriptive data relating to at least a subset of a plurality of entities on a website, the descriptive data comprising a plurality of descriptive data entries, each descriptive data entry relating to a respective one of the subset of the plurality of entities; endorsement data retrieving logic for retrieving from the website, endorsement data relating to the plurality of entities, the endorsement data comprising a plurality of endorsements, each endorsement relating to a respective one of the plurality of entities and a respective one of a plurality of users; entity-aspect determination logic for determining using the descriptive data and the endorsement data, a first set of probabilities, each of the first set of probabilities reflecting a probability that a respective one of the plurality of endorsements can be attributed to a respective one of a plurality of aspects, each of the plurality of aspects representing a cluster of entities; term-aspect determination logic for determining, using the descriptive data and the endorsement data, a second set of probabilities, each of the second set of probabilities reflecting a probability that a respective one of a plurality of terms can be attributed to a respective one of the plurality of aspects; tag selection logic for selecting using the first set of probabilities and the second set of probabilities, for each entity, a respective subset of the plurality of terms that are most probably associated with the respective entity; tag generation logic executed by the processor for generating, for each entity, using the respective subset of the plurality of terms that are most probably associated with the respective entity, a respective set of tags, each tag reflecting one of the subset of the plurality of terms.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "entity" should be understood to refer generally to identifiable objects stored on a website. In one embodiment, such entities could include user entities (e.g. a user profile) and/or content entities such as text, images, and/or multimedia files created by users and/or by system processes.

For the purposes of this disclosure the term "social networking system" should be understood to refer generally to websites that focus on social networks or social relations among users. In various embodiments, social network systems store representations of users and the user's relationships with other users. Social networking services often provide users means to upload or create various types of content entities to the system such as, for example, text, images and multimedia objects. Such systems may additionally provide means for users to comment on or tag entities created by themselves and/or other users and to endorse entities created by other users. Examples of such websites includes the TWITTER microblogging service and the FACEBOOK social networking service.

For the purposes of this disclosure the term "socially enabled online content websites" should be understood to refer generally to websites that focus on providing means for users to upload online content and share such content with other users. Such websites may or may not explicitly store relationships among users. Such systems may provide means for users to comment on or tag entities created by themselves and/or other users and to endorse entities created by other users. Examples of such websites includes the FLICKER and PHOTOBUCKET image sharing services.

For the purposes of this disclosure the terms "endorsement" and "social endorsement" should be understood to refer generally to any action by a user on a socially enabled websites that tends to indicate the user is interested in a particular entity, such as another user or a content object created by another user. For example, on the TWITTER microblogging websites, users endorse other users by "following" other users. On the FACEBOOK social networking websites, users endorse entities by "liking" the entities.

The presently disclosed systems and methods provide means to generate tags for entities on socially enabled websites using text associated with entities, as well as social endorsements of such entities. In various embodiments, the system and methods disclosed herein resolve the ambiguity associated with endorsements using statistical topic modeling to capture user-interests and use them to extract meaningful tags for the entities they endorse. The basic principle is that entities that are frequently co-endorsed by users with the same interests are more likely to have the same or similar tags.

Generating Tags Using Text

Online content websites commonly allow users to post and tag online content, comment on their own and others content and endorse other's content. Tags can be automatically generated based on tags and comments associated with such content. For the purposes of the following discussion. Let:

$\epsilon$ denote a set of entities (user or content objects) on website to be tagged, $d_e$ represent the "bag-of-terms" associated with each entity, with terms coming from vocabulary V.

$n_{t|e}$ denotes the number of times term t occurs in $d_e$, $n_{\cdot|e}$ the total occurrences of terms in $d_e$, and $n_{t|\cdot}$ the total number of unique entities that have text containing t.

One simple method for obtaining tags from the text associated with entities is to treat such text as documents in a information retrieval setting and to use the TFIDF (Term Frequency-Inverse Document Frequency) method for scoring words, For example, given a entity e from a collection $\epsilon$ and a term t, the measure can be defined:

$$TD-IDF(t, e) = \frac{n_{t|e}}{n_{\cdot|e}} \log \frac{|\epsilon|}{n_{t|\cdot}}$$

While this method has been shown to be highly effective in various information retrieval tasks it suffers from a number of drawbacks. For example, this method can result in extremely obvious or obscure tags. For example, in one experiment using data obtained from TWITTER, for the entity Al Gore, the former vice president of USA, the top two tags obtained using TFIDF "al gore" and "futurama". The first is trivially the entity's name. The second is a popular TV show that sometimes features Al Gore as a gimmick. Further, if are multiple reasons that make an entity appealing, then TF-IDF may identify redundant tags from a dominant aspect before identifying tags from any of the others. Finally, this approach depends heavily on the text available for each entity: uninformative text leads to irrelevant tags and the lack of text renders the method inapplicable.

A key insight from the above discussion is that an entity can appeal to users of a social system for various reasons. For example, some of Lance Armstrong's followers on TWITTER may be due to his status as a world-class cyclist, while others choose to follow him for his significant charity work. In another example, on FLICKR, a picture of the Eiffel tower in Paris may be "favorited" by people who like Paris in particular, as well by those who care about architecture in general.

The various reasons for an entity's appeal are topics referred to herein as "aspects". Using such aspects, non-redundant tags that are representative of the different facets of an entity can be identified, at a high-level, as follows:

Identify the aspects that make each entity appealing and compute a term-based representation of each aspect.

Extract tags, based on each entity's aspects of appeal and each aspect's term-based representation.

Text Aspects

A reasonable assumption is that some other aspects of an entity's appeal are represented in the text associated with it. For example, on TWITTER, Lance Armstrong's tweets concern his cycling career as well as his charity work. Hence, both of these central aspects of his appeal are captured in his tweets. Similarly, on FLICKR, the comments associated with a picture of the Eiffel Tower may address admiration for Paris, as well as for impressive architecture feats.

Such aspects that are latent within text are referred to herein as text aspects. In one embodiment, one method to extract text aspects is by modeling the text associated with entities using the Latent Dirichlet Allocation (LDA) approach.

In one embodiment, a LDA generative model states that each word in a document is generated within the document by first picking a topic, and then picking a word associated with the topic. The topics are picked from a document specific distribution. In one embodiment of a text generation process, the text associated with an entity is assumed to have been generated by the above process with the topics representing the aspects of an entity's appeal. For the purposes of the following discussion. Let:

K be the set of aspects for the set of entities $\epsilon$ $\alpha$ and $\beta$ be Dirichlet smoothing parameters, $\Theta$ be the set of aspect-entity distributions, and $\Phi$ be the set of term-aspect distributions In the generation process $t_i$ and $z_i$ indicate a word in a $d_e$ and the aspect that generates it, respectively. Given this notation, the text generation process is:

1. For all aspects k, sample $\phi_k \sim Dir(\beta)$
2. For all entities e, sample $\theta_e \sim Dir(\alpha)$
3. For each term-slot in $d_e$
   (a) Sample an aspect $z_i \sim Mult(\theta_e)$
   (b) Sample a term $t_i = w \sim Mult(\phi_{z_i})$ In one embodiment, the parameter-sets $\Theta$ and $\Phi$ can be learned by determining an assignment of term-slots to aspects z following a collapsed Gibbs sampling method. In one embodiment, the core of the method relies on sampling a new value for the aspect $z_i$ that generated the term w at term-slot $t_i$ using the aspect assignments of all other term-slots (i.e. $z_{-i}$) as follows.

$$P(z_i = k \mid t_i = w, t_{-i}, z_{-i}) \propto \frac{n_{k|e,-i} + \alpha}{|d_{e,-i}| + \alpha|K|} \times \frac{n_{t|k,=i} + \beta}{n_{\cdot|k,-i} + \beta|v|} \quad (1)$$

where $n_{5|e,-i}$ is the number of times aspect k is observed for entity e, $n_{t|k,-i}$ is the number of times term t is sampled from aspect k, $|d_{e,-i}|$ is the number of term occurrences associated with e, and $n_{\cdot|k,-i}$ is the total number of entities generated from aspect k, All these quantities are computed over all slots except $i^{th}$ the one. The learned distributions:

$$\Theta: \{\theta_{ek} = p(e|k), \forall_e \epsilon \epsilon, k \epsilon K\} \text{ and}$$

$$\Phi: \{\phi_{kt} = p(|k) \forall_k \epsilon K, t \epsilon v\}$$

are called the aspect-entity and term-aspect distributions, respectively. $\theta_e$ gives the probability that the appeal of a given entity e is due to aspect k and $\phi_k$ represents the probability of a term showing up given an aspect k. Given this knowledge, techniques such as those described below can be used to extract tags.

Endorsement Aspects

While use of text aspects solves some of the problems with redundancy and coverage of tags, it faces a different issue: the mined text aspects are just a proxy to the true aspects of an entity's appeal, since they only capture the facets of an entity that are present in the associated text. Furthermore, where no text at all is associated with an entity, no tags can be generated at all. Consider the following examples.

TWITTER: While Lance Armstrong's tweets may cover the cycling and philanthropy aspects of his appeal to users, they might not capture his appeal to others who identify with and follow Armstrong because he is a famous American from Texas, or because he is a Cancer Survivor.

FLICKR: On FLICKR, a picture of Paris taken by a famous photographer may appeal to people who follow this particular photographer's work. It might be the case, however, that this aspect is not adequately represented in the comments associated with photograph (there may, in fact, be none), and therefore will be erroneously overlooked.

Websites such as TWITTER and FLICKR, however, provide another source of information regarding entities: social endorsement networks. Social endorsement networks can be used to extract high quality tags from the noisy and inadequate text associated with entities. The underlying social endorsement network can be visualized as a bipartite graph with edges (endorsement) from users to entities.

This network encodes the relationship between the latent interests of the users and the ensuing entity endorsements. This information can be used to determine an aspect-entity distribution by mining the underlying social endorsement graph. Social endorsements are suited to this purpose since they directly encode the appeal of the entity to the users. In addition, not only is endorsement functionality available in virtually every major social networking platform, most socials systems are designed around it, ensuring an abundance of endorsement data for almost all entities.

Consider a simple scenario where user $u_1$ endorses entities $e_1$, $e_2$ and $e_3$ and user $u_2$ endorses entities $e_1$ and $e_4$. The adjacency list is then written as:

$u_1 e_1 e_2 e_3$
$u_2 e_1 e_4$

Each of the entities is associated with one or more aspects. Assuming a generative model in which a user first picks a topic/aspect among the users interests and then picks an entity that is popular or characteristic of that aspect, Latent Dirichlet Allocation (LDA) techniques can be applied on the adjacency list. Given a number of aspects as an input parameter, LDA shows how much each aspect appeals to each user, as well as how likely it is for each entity to be endorsed, given a specific aspect of interest.

Note that aspects are empirically revealed as unlabeled clusters of entities: while the LDA analysis reveals that one or aspects exist and that a cluster of entities is associated with each, the analysis does not directly reveal what such aspect is from a user's point of view. Note also that the number of aspects input to the analysis is simply an arbitrary count of the number of aspects the analysis is to attempt to reveal. As a practical matter, for any given data source, it may be empirically determined that a given count of aspects is optimal for tag extraction. For example, it was empirically determined in one experiment that a number of aspects of 400 worked well for data from the TWITTER microblogging website.

Given an endorsement to an entity e, this information can be used to compute p(k|e), the probability that this endorsement can be attributed to a specific aspect k. In one embodiment, p(k|e) can be computed as follows.

$$\theta_{ek} = p(k|e) = \frac{p(e,k)}{p(e)} \propto \sum_{u \in U} p(u) p(k|u) p(e|k) \quad (1)$$

Where p(u) is the probability that the user u makes an endorsement. This probability can be assumed to be the same for all users in U, or in domains where there is reasonable evidence that some users have a stronger propensity to endorsements than others, it can be learned from a training corpus. Conceptually, p(k|u) is the probability that user u makes an endorsement due to aspect k (aspect-user distribution) and p(e|k) is the probability that entity e gets endorsed due to (its association with) aspect k (entity-aspect distribution). Hence, the system will compute the term-aspect distribution needed to find tags, by first breaking down social endorsement network into the aspect-user and entity-aspect distributions.

For examples, a user who is interested in cycling, is likely to endorse entities based on this aspect. Moreover most users are likely to have many interests, and will likely have a distribution over these interests. Also, a world-famous Cyclist such as Lance Armstrong is more likely to be endorsed due to his status in the context of this aspect. However, Lance Armstrong is also famous for his philanthropy and hence will attract some endorsement through it.

In one embodiment, the probabilities p(k|u) and p(e|k) needed to obtain the distribution, $\theta_{ke}$, over the set of aspects for each entity is determined as follows. Let:

U denote the set of users who endorse entities picked from the set $\epsilon$,
K be the set of aspects,
$\alpha'$ and $\beta'$ be Dirichlet smoothing parameters,
$\Psi$: $\{\phi_{uk} = p(k|u), \forall u \in U, k \in K\}$ represents the set of aspect-user distributions,
$\xi$: $\{\xi_{ke} = p(e|k), \forall k \in K, e \in \epsilon\}$ represents the set of entity-aspect distributions,
Dir is an LDA function.

In the generation process $e_i$ and $y_i$ indicate a entity in the endorsed set $\epsilon(u)$ of a user u and the aspect it is sampled from, respectively. Given this notation, the endorsement generation process is:

1. For all aspects k; sample $\xi_k \sim Dir(\beta')$
2. For all users u; sample $\psi_u \sim Dir(\alpha')$
3. For each endorsement slot $\epsilon(u)$
   (a) Sample an aspect $y_i \sim Mult(\psi_u)$
   (b) Sample an entity $e_i \sim Mult(\psi_u)$ In one embodiment, the distribution-sets $\psi$ and $\xi$ can be learned by finding an assignment of each endorsement in the observed data to an aspect using a collapsed Gibbs sampling method. In order to do so, an expression must be derived that gives the probability that one particular endorsement from a user u to entity $e_i = 1$ was due to aspect $y_i$. One such sampling equation could be:

$$P(y_i = k | e_i = l, e_{-i}, y_{-1}) \propto \frac{n_{k|u,-i} + \alpha'}{|\epsilon(u)| + \alpha'|K|} \times \frac{n_{e|k,-i} + \beta'}{n_{\cdot|k,i} + \beta'|\epsilon|} \quad (2)$$

where $n_{k|u,-i}$ is the number of times aspect k is observed for user u, $n_{e|k,-i}$ is the number of times entity e is sampled from aspect k, $|\epsilon(u)|$ is number of entities endorsed by user u, and $n_{\cdot|k,-i}$ is the total number of entities generated from aspect k, All these quantities are computed over all endorsement-slots except the $i^{th}$ one. The learned aspect-user distributions $\psi_u$ and entity-aspect distributions $\xi k$ give the probabilities p(k|u) and p(e|k).

Efficiently Learning the Term Aspect Distributions

Once p(k|e), the probability that this endorsement can be attributed to a specific aspect k has been determined, the term-aspect distribution can be determined. As noted above, the term-aspect distribution represents the probability of a term showing up given an aspect k. In one embodiment, the term-aspect distribution $\phi_k$ can then be determined using the equation, $$P(z_i = k | t_i = w, t_{-1}, z_{-i}) \propto p(k|e) \times \frac{n_{t|k,-i} + \beta}{n_{\cdot|k,=i} + \beta|v|} \quad (3)$$

Where $p(k|e) = \theta_{ke}$, as computed above.

In one embodiment, sparse LDA sampling can be utilized to increase the efficiency of the LDA sampling process, The method is based on the observation that parts of the computations are independent one another and can thus be cached to reduce computational cost. Given Eq. (3) we can apply the sparse LDA sampling process can be applied by noticing that the right-hand side of the equation can be re-written as the product of the two following factors:

$$r = \sum_k \frac{p(k|e)\beta}{n_{\cdot k,-i} + \beta|v|}, \quad q = \sum_k \frac{p(k|e) n_{t|k,-i}}{n_{\cdot k,-i} + \beta|v|}$$

The sampled value x~U(0, r+q) can now fall within two buckets, depending on whether x<r or r<x<q. The numerator of r is now a constant and can be precomputed for each aspect-entity. The denominator can be cached for each aspect and updated by simply subtracting and adding the values of re-sampled aspects. For q, the value $$\frac{p(k \mid e) n_{t \mid k, -i}}{n_{\cdot, k, -i} + \beta \mid v \mid}$$

can be cached for every aspect k by tracking entities for which p(k|e)≠0. A single multiplication for each aspect k with $n_{t|k} \neq 0$ is then enough to compute q for a given term t.

From Aspects to Tags

In one embodiment, high quality tags are strongly correlated with an entity and serve as effective discriminators that make an entity stand out from the other entities. For example, very generic tags that are correlated with the vast majority of the entities convey no useful information. At the same time, tags are ideally frequently used terms that are familiar to the users. This is useful in applications like search, where an entity needs to be matched to user queries based on its tags.

In one embodiment, an information gain measure can be used to identify the best tags for each entity. Information gain measures the information gained with respect to an entity when observing a specific tag, based on the probabilities computed above.

Given an entity e, an aspect k with probability equal to p(k|e) is selected from a pool of aspects. Then, a term t with probability p(t|k) is selected and assigned to e. In one embodiment, the goal is to learn p(t|k) for every term t and every aspect k. In one embodiment, tags are then assigned to each entity using Information Gain (IG) measure. In one embodiment, given a term t and an entity e, we define the measure as follows:

$$IG(t \mid e) = -p(e) \log p(e) + \\ p(t)[p(e \mid t) \log p(e \mid t) + p(\neg e \mid t) \log p(\neg e \mid t)] + \\ p(\neg t)[p(e \mid \neg t) \log p(e \mid \neg t) + p(\neg e \mid \neg t) \log p(\neg e \mid \neg t)]$$

This equation measures the reduction in the entropy associated with entity e, incurred by the presence or absence of term t. The entropy itself is the same for all terms, thus it can be omitted. We compute p(t) as follows:

$$p(t) = \sum_k \sum_e p(e) p(k \mid e) p(t \mid k)$$

p(e)=1/|e| is assumed to be the same for all entities, p(k|e) is computed by equation (1) and p(t|k) is computed as part of the term distributions described above; p(e|t) is computed as follows:

$$p(e \mid t) = p(e, t) / p(t) = \sum_k p(e) p(k \mid e) p(t \mid k) / p(t)$$

In one embodiment, after computing information gain scores, an entity can be associated with a fixed number of top-scoring terms or all terms with a score over a predetermined threshold.

Note that the tags assigned to an entity using the above mechanism depend only on the entity's aspect distribution and not on the text associated with the entity (if any). This allows tags to be assigned to entities having no associated text at all (e.g. an image with no associated metadata or comments). Where text is available for an entity, tags can be made even more entity-specific by considering the frequency of each tag in the entity's individual text corpus.

Figure 1:
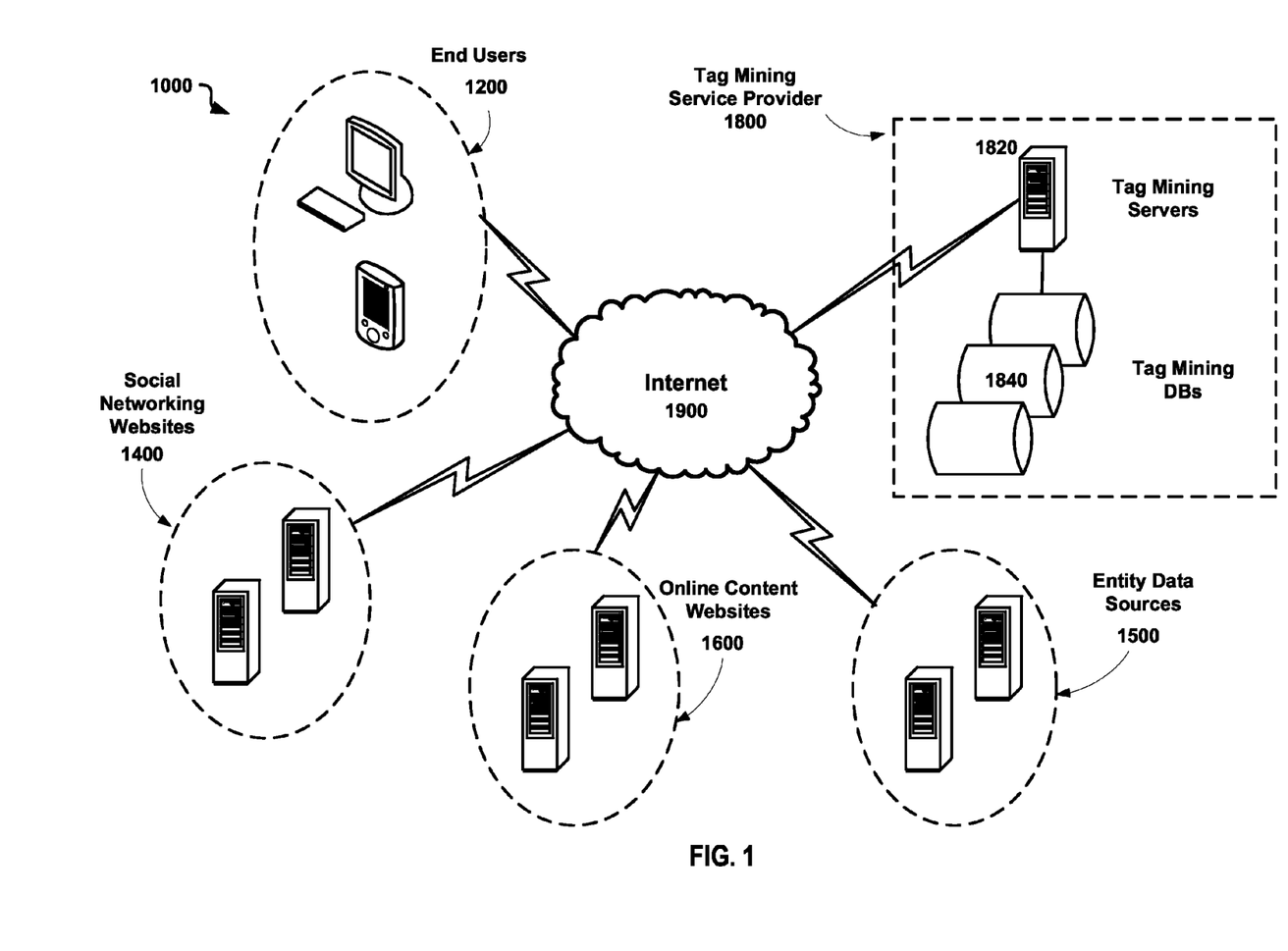
FIG. 1 illustrates a high-level view of one embodiment of a system capable of supporting various embodiments of the systems and methods described herein.

FIG. 1 illustrates a high-level view of one embodiment of a system 1000 capable of supporting various embodiments of the systems and methods described herein. End users 1200 access social networking websites 1400 over a network, such as, for example, the Internet 1900. The social networking websites 1400 can provide facilities for the users 1200 to create entities such as user profiles and data objects, including text, image and multimedia objects. Such websites 1400 can additionally allow users to tag entities they create with various types of metadata, including labels and comments. Such websites 1400 can additionally allow users to comment on and/or endorse entities created by other users. Examples of social networking websites 1400 include, but are not limited to, the TWITTER and FACEBOOK social networking websites.

In one embodiment, end users 1200 can additionally access socially enabled online content websites 1600 over a network, such as, for example, the Internet 1900. In one embodiment, the socially enabled online content websites 1600 provide facilities for the users 1200 to create to create entities such as user profiles and data objects, including text, image and multimedia objects for sharing with other users. Such websites 1600 can additionally allow users to tag entities they create with various types of metadata, including labels and comments. Such websites 1600 can additionally allow users to comment on and/or endorse entities created by other users. Examples of socially enabled online content websites 1600 include, but are not limited to, FLICKR and PHOTOBUCKET photo sharing websites.

A tag mining service provider provides 1800 tag mining services that create tags for entities on one or more social networking websites 1400 and/or socially enabled online content websites 1600. In one embodiment, tag mining servers 1820 retrieve data relating to a plurality of entities on one or more social networking websites 1400 and/or socially enabled online content websites 1600. In one embodiment, tag mining servers 1820 retrieve additional data relating to at least some of the entities from additional entity data sources 1500 such as, for example, the GOOGLE or YAHOO! web search services such as relating to at least some of the plurality of entities In one embodiment, tag mining servers 1820 use the retrieved data to create tags for at least some of the plurality of entities. In one embodiment, tag mining servers 1820 create tags by analyzing social endorsement graphs for the plurality of entities within the retrieved data utilizing the methods described herein.

In one embodiment, tag mining servers 1820 store retrieved data and mined tags on one or more tag mining databases 1840 stored on storage devices accessible to the tag mining servers 1820. In one embodiment, tag mining servers 1820 use mined tags to tag entities on one or more of the social networking websites 1400 and/or socially enabled online content websites 1600. In one embodiment, tag mining servers 1820 transmit mined tags to one or more of the social networking websites 1400 and/or socially enabled online content websites 1600 for processing on such websites.

The system shown in FIG. 1 is purely illustrative. Those skilled in the art will appreciate that the functions provided by the system in FIG. 1 could be provided by a number of alternate configurations. For example, services provided by tag mining servers 1820 could be distributed across multiple servers controlled by more than one entity. For example, tag mining servers 1820 and databases 1840 could represent virtual servers and cloud-based data storage provided by one or more cloud-based services entities. Alternatively or additionally, tag mining services could be implemented on servers operated by social networking websites 1400 and/or socially enabled online content websites 1600.

Figure 2:
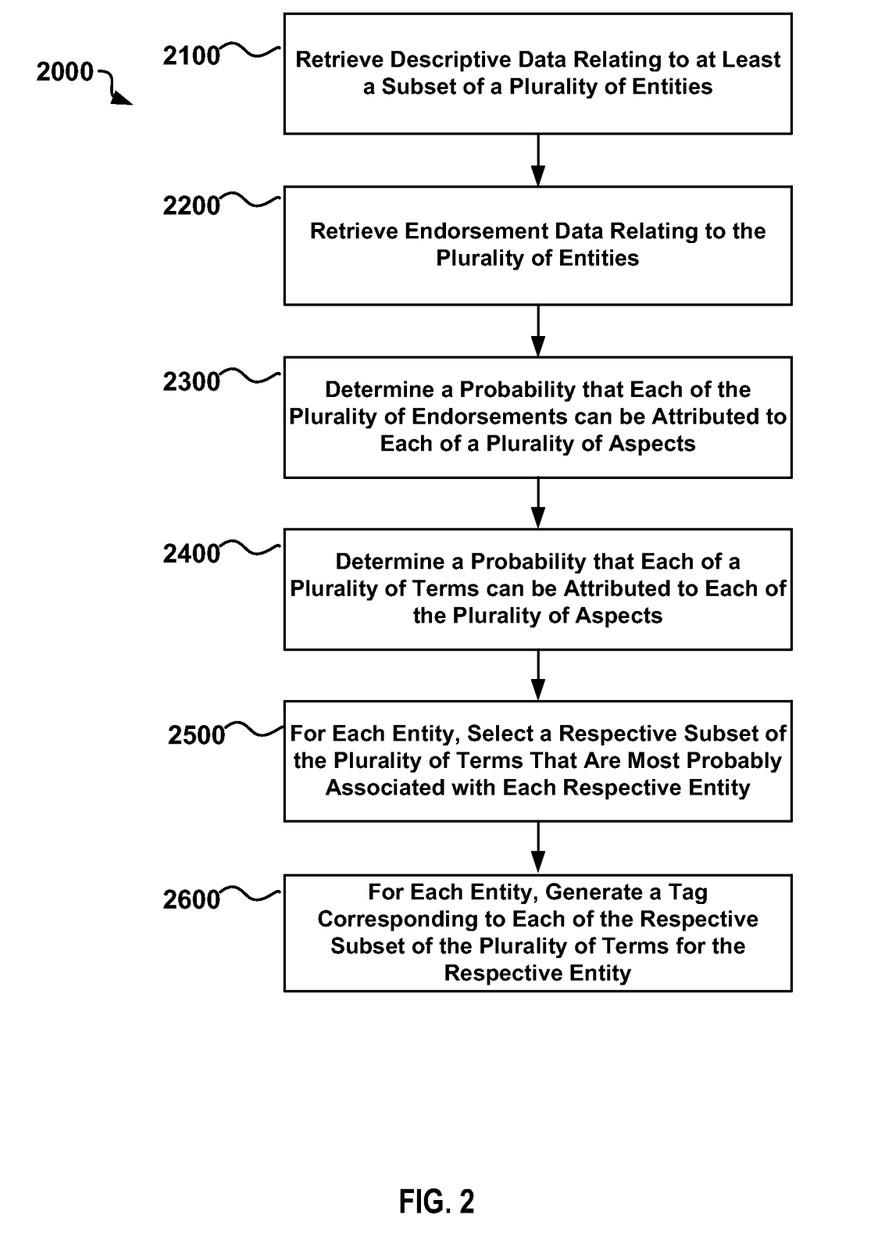
FIG. 2 illustrates a computer implemented process for mining tags using social endorsement graphs.

FIG. 2 illustrates a computer implemented process 2000 for mining tags using social endorsement graphs. Unless otherwise specified, it should be understood that the processing described with respect to each of the blocks of FIG. 2 is performed by at least one computing device maintained or controlled by tag mining service. In one embodiment, such a computing device could be one or more of the tag mining servers 1820 of FIG. 1.

In block 2100, descriptive data relating to at least a subset of a plurality of entities on a website is retrieved over a network. The descriptive data comprises a plurality of descriptive data entries, each descriptive data entry relating to a respective one of the subset of the plurality of entities. Descriptive data serves as the source of text for generating tags for the plurality of entities. Descriptive data need not be available for every entity to be tagged, since social endorsements can allow text associated with one or more entities to be used as a text source for other entities.

In one embodiment, entities can comprise any identifiable object on the website. Such objects could include, without limitation, objects defining a user, objects including text, objects including image data, objects including image data or any other type of multimedia object. The website itself could be any type of website that allows users to create entities on the website. Such websites could include social networking websites such as TWITTER or FACEBOOK websites or socially enabled online content websites such as FLICKR.

In one embodiment, descriptive data entries comprise text, or data that can be translated, transformed or interpreted as text. Descriptive data entries can include text that tends to describe the entity or an aspect of the entity's appeal. Such data could relate to, for example, text any type of topic, such as a sport, a location, a physical object, a concept or an attribute. Specific examples could include UK TV Personalities, Technology People, NBA basketball, US Teen Celebrities, Cycling, Twilight, Political Commentators, Brazilian Celebrities, Country Music and Rock Music.

Descriptive data for entities could be retrieved from any source having data relating to the entities that is, or is capable of being, represented as text. In one embodiment, aspect data is retrieved from the website on which the entity is defined. On a social networking site, such data could be, without limitation, messages posted by, or replies sent to posts of, a user. For example, on TWITTER, an user's tweets could be a source of text relating to the user. On a website that allows users to post content such as images and the like, such data could be, without limitation, titles or tags applied to the content, as well as comments on the content by the posting user and other users.

In one embodiment, descriptive data is additionally or alternatively retrieved from one or more sources separate from the website on which the entity is defined. For example, aspect data could be retrieved by executing a web search query on an entity's name, and text could be extracted from the top matches on the web search result. On the opposite end of the spectrum, aspect data could also be retrieved from a data file having manually created tags for entities.

In various embodiments, descriptive data can be retrieved from various data sources using any methods now known or later to be developed in the art. Such methods could include retrieving files comprising batched historical data, subscribing to real-time data feeds from data sources, using a public API provided by data sources, or interacting with a user interface of a data source (e.g. a publicly accessible web page).

In one embodiment, descriptive data for a subset of the plurality of entities are selected because reliable descriptive data can be readily obtained for such entities. As noted above, this descriptive data is ultimately used to generate tags, so the process is most effective when descriptive data is highly specific and accurate. Various techniques can be used to obtain accurate aspect data. One type of accurate aspect data could be provided via a set of manually labeled aspect data. More automated techniques are, however, desirable.

In one embodiment, data is retrieved for entities where each of the entities has a large corpus of data available that provides detailed information about the entity. For example, the subset of the plurality of entities could represent users on TWITTER that have a large number of followers. It can be assumed that such users are famous, popular or well known entities. On average, there is a large amount of information available relating to such users on the Internet. In one embodiment, aspect data could be retrieved relating to such users by executing a web search query on the user's name, and text could be extracted from the top matches on the web search result.

In block 2200, endorsement data relating to the plurality of entities is retrieved over the network. The endorsement data comprises a plurality of endorsements, each endorsement relating to a respective one of the plurality of entities and a respective one of a plurality of users;

In one embodiment, endorsement data comprises any kind of data indicating that a user endorses, likes, or is interested in specific entities. For example, On TWITTER, users have the option to "follow" other users and get updates on their tweets. On FACEBOOK, users can "like" various types of items such as pictures or videos. On FLICKR, users can "favorite" pictures that they find appealing.

In one embodiment, the plurality of entities could represent all entities on a website. In one embodiment, the plurality of entities could represent entities on a website having specific properties, for example, the plurality of entities could reflect only active users on TWITTER or only images on FACEBOOK.

In various embodiments, endorsement data can be retrieved using any methods now known or later to be developed in the art. Such methods could include retrieving files comprising batched historical data, subscribing to real-time data feeds from data sources, using a public API provided by data sources, or interacting with a user interface of a data source (e.g. a publicly accessible web page).

In block 2300, using the descriptive data and the endorsement data, a first set of probabilities is determined using a computing device. Each of the first set of probabilities reflects a probability that a respective one of the plurality of endorsements can be attributed to a respective one of a plurality of aspects. In one embodiment, each aspect of the plurality represents a cluster of entities associated with one another via a clustering analysis, for example, LDA analysis.

In one embodiment, the first set of probabilities is determined in process comprising three operations. In the first operation, using the descriptive data and the endorsement data, a third set of probabilities is determined using a computing device. Each of the third set of probabilities reflects a probability that a respective one of the plurality of users associated with a respective one of the plurality of endorsements made the respective endorsement due to a respective one of the plurality of aspects.

In the second operation, using the descriptive data and the endorsement data, a fourth set of probabilities is determined using a computing device. Each of the fourth set of probabilities reflects a probability that a respective one of the plurality of users associated with a respective one of the plurality of endorsements made the respective endorsement due to a respective one of the plurality of aspects.

In the third operation, the first set of probabilities is determined, using the computing device, using the third set of probabilities and the fourth set of probabilities. In one embodiment, the first and second operations are performed in parallel on the computing device. In one embodiment, the first, second and third operations are performed in parallel on the computing device.

In one embodiment, each of the first set of probabilities is p(k|e), the probability that a given endorsement of an entity e can be attributed to a specific aspect k which, in one embodiment, can be calculated as described in detail above.

In one embodiment, each of the third set of probabilities is p(k|u), the probability that the user u makes an endorsement due to aspect k which, in one embodiment, can be calculated as described in detail above.

In one embodiment, each of the fourth set of probabilities is p(e|k), the probability that the entity e is endorsed due to its association with aspect k which, in one embodiment, can be calculated as described in detail above.

In block 2400, using the descriptive data and the endorsement data, a second set of probabilities is determined using the computing device. Each of the second set of probabilities reflects a probability that a respective one of a plurality of terms can be attributed to a respective one of the plurality of aspects.

In one embodiment, each of the first set of probabilities is p(t|k), the probability that a given term t can be attributed to a specific aspect k which, in one embodiment, can be calculated as described in detail above.

In block 2500, using the first set of probabilities and the second set of probabilities, for each entity, a respective subset of the plurality of terms that are most probably associated with the respective entity are selected.

In one embodiment, the terms that are most probably associated with a given entity is determined using the probability p(e|t), the probability that a given entity e can be associated with a given term. The probability p(e|t) in one embodiment, can be calculated as described in detail above. In one embodiment, a threshold probability can be set such that a minimum value is required for p(e|t) to select a term for a given entity.

In block 2600, for each of the plurality of entities, a respective set of tags is generated using respective subset of the plurality of terms that are most probably associated with the respective entity. Each of the set of tags tag reflects one of the subset of the plurality of terms selected for the entity. The tags could, in turn, be used to update the respective entities on the website on which they reside.

Figure 3:
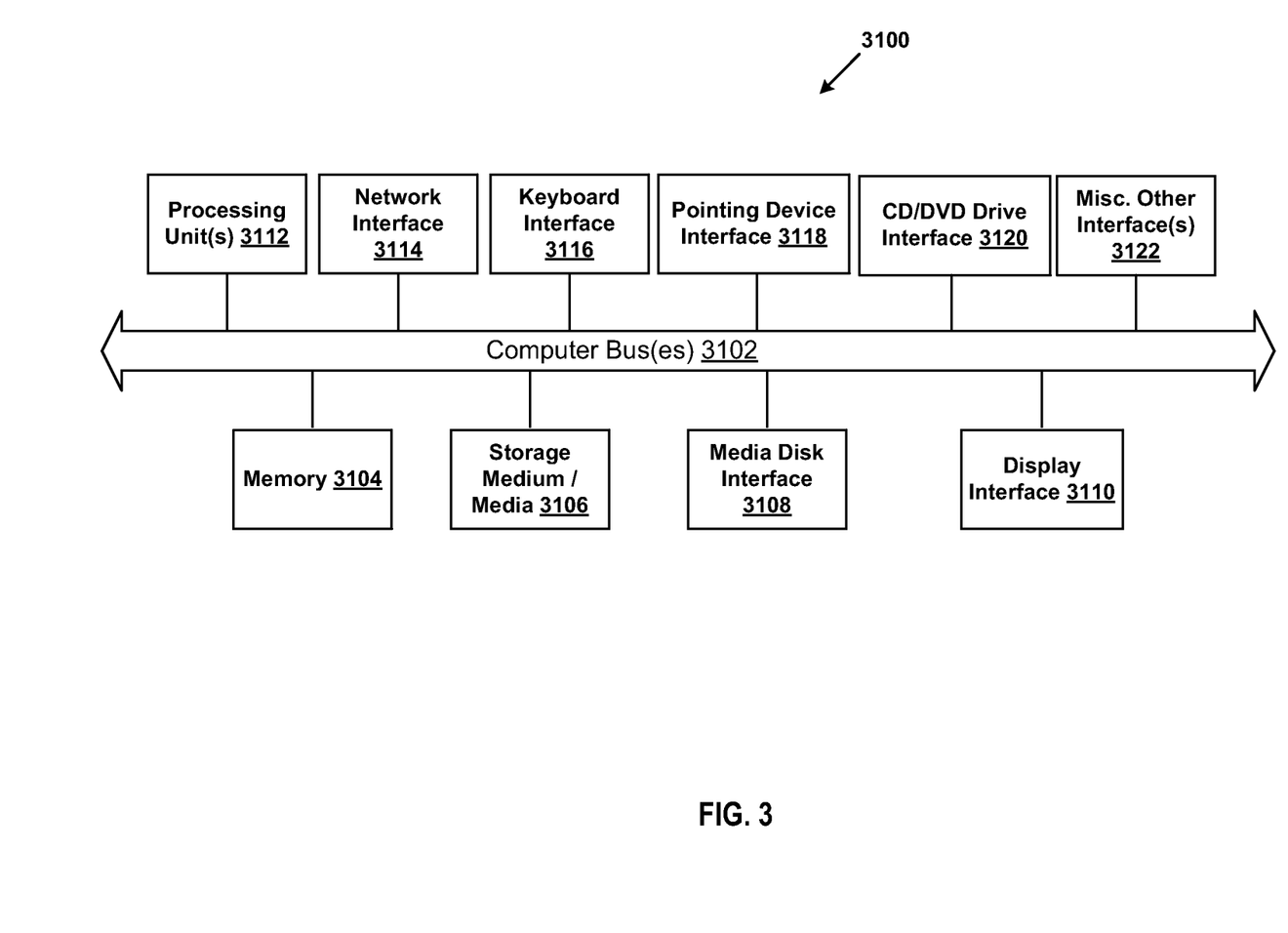
FIG. 3 is a block diagram illustrating an internal architecture of an example of a computing device.

FIG. 3 is a block diagram illustrating an internal architecture of an example of a computing device. In one embodiment, FIG. 3 could represent the internal architecture of the online content servers 1820 of FIG. 1 in accordance with one or more embodiments of the present disclosure. A computing device as referred to herein refers to any device with a processor capable of executing logic or coded instructions, and could be a server, personal computer, set top box, smart phone, pad computer or media device, to name a few such devices.

As shown in the example of FIG. 3, internal architecture 3100 includes one or more processing units (also referred to herein as CPUs) 3112, which interface with at least one computer bus 3102. Also interfacing with computer bus 3102 are persistent storage medium/media 3106, network interface 3114, memory 3104, e.g., random access memory (RAM), run-time transient memory, read only memory (ROM), etc., media disk drive interface 3108 as an interface for a drive that can read and/or write to media including removable media such as floppy, CD-ROM, DVD, etc. media, display interface 3110 as interface for a monitor or other display device, keyboard interface 3116 as interface for a keyboard, pointing device interface 3118 as an interface for a mouse or other pointing device, and miscellaneous other interfaces not shown individually, such as parallel and serial port interfaces, a universal serial bus (USB) interface, and the like.

Memory 3104 interfaces with computer bus 3102 so as to provide information stored in memory 3104 to CPU 3112 during execution of software programs such as an operating system, application programs, device drivers, and software modules that could comprise program code that, when executed by CPU 3112, perform the processing described with respect to the blocks of FIG. 8 above. CPU 3112 first loads computer-executable process steps from storage, e.g., memory 3104, storage medium/media 3106, removable media drive, and/or other storage device. CPU 3112 can then execute the stored process steps in order to execute the loaded computer-executable process steps. Stored data, e.g., data stored by a storage device, can be accessed by CPU 3112 during the execution of computer-executable process steps.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
retrieving, over a network at a computing device, descriptive data relating to at least a subset of a plurality of entities on a web site, the descriptive data comprising a plurality of descriptive data entries, each descriptive data entry relating to a respective one of the subset of the plurality of entities;
retrieving, over the network at the computing device, from the website, endorsement data relating to the plurality of entities, the endorsement data comprising a plurality of endorsements, each endorsement relating to a respective one of the plurality of entities and a respective one of a plurality of users;
determining, via the computing device, based on the descriptive data and the endorsement data, a first set of probabilities, each of the first set of probabilities reflecting a probability that a respective one of the plurality of endorsements is attributable to a respective one of a plurality of aspects determined from a sampling of a respective aspect value at an assigned term-slot, each of the plurality of aspects representing a cluster of entities;
determining, via the computing device, based on the descriptive data and the endorsement data, a second set of probabilities, each of the second set of probabilities reflecting a probability that a respective one of a plurality of terms is attributable to a respective one of the plurality of aspects;
selecting, via the computing device, based on the first set of probabilities and the second set of probabilities, for each entity, a respective subset of the plurality of terms that are most probably associated with the respective entity; and
generating, via the computing device, for each entity, based on the respective subset of the plurality of terms that are most probably associated with the respective entity, a respective set of tags, each tag reflecting one of the subset of the plurality of terms.

2. The method of claim 1 further comprising:
determining, using the computing device, for each of the at least a subset of the plurality of entities, a frequency of each of the respective subset of terms in the respective descriptive data entries for the respective entity, wherein the terms having the highest frequency are selected.

3. The method of claim 1 further comprising:
transmitting, over the network, for each of the plurality of entities, the respective set of tags to the website; and
causing, using the computing device, the website to update each of the plurality of entities with the respective set of tags relating to the entity.

4. The method of claim 1, further comprising determining an assignment of each endorsement to an aspect using a collapsed Gibbs sampling method.

5. The method of claim 4 where collapsed Gibbs sampling method uses the equation:

$$P(y_i = k \mid e_i = l, e_{-i}, y_{-1}) \propto \frac{n_{k|u,-i} + \alpha'}{|\varepsilon(u)| + \alpha'|K|} \times \frac{n_{e|k,-i} + \beta'}{n_{.|k,i} + \beta'|\varepsilon|}$$

where $n_{k|u,-i}$ is the number of times aspect k is observed for user u,
$n_{e|k,-i}$ is the number of times entity e is sampled from aspect k,
$|\varepsilon(u)|$ is number of entities endorsed by user u, and
$n_{.|k,-i}$ is the total number if entities generated from aspect k,
such that the above quantities are computed over all endorsement-slots except the $i^{th}$ one.

6. The method of claim 1 where each of the first set of probabilities is $\theta_{ek}=p(k|e)$, calculated as follows for each of the plurality of aspects k and each of the plurality of entities e:

$$\theta_{ek} = p(k \mid e) = \frac{p(e, k)}{p(e)} \propto \sum_{u \in U} p(u)p(k \mid u)p(e \mid k)$$

where p(u) is the probability that a user u makes an endorsement.

7. The method of claim 6 where the term-aspect distribution is determined by said sampling the value for an aspect $z_i$ that generated the term W at a term-slot $t_i$ using the aspect assignments of all other term-slots z−i as follows:

$$P(z_i = k \mid t_i = w, t_{-i}, z_{-i}) \propto \frac{n_{k|e,-i} + \alpha}{|d_{e,-i}| + \alpha|K|} \times \frac{n_{t|k,=i} + \beta}{n_{.|k,-i} + \beta|\upsilon|}$$

where $n_{k|e,-i}$ is the number of times one of the plurality of aspects k is observed for one of the plurality of entities e,
$n_{t|k,-i}$ is the number of times one of the plurality of terms t is sampled from k,
$|d_{e,-i}|$ is the number of term occurrences associated with e, and
$n_{.|k,-i}$ s the total number of entities generated from aspect k,
α and β are Dirichlet smoothing parameters.

8. The method of claim 6 where the term-aspect distribution is determined by sampling a value for an aspect $z_i$ that generated the term W at a term-slot $t_i$ using aspect assignments of all other term-slots z−i as follows:

$$P(z_i = k \mid t_i = w, t_{-i}, z_{-i}) \propto p(k \mid e) \times \frac{n_{t|k,-i} + \beta}{n_{.|k,=i} + \beta|\upsilon|}$$

where $n_{t|k,-i}$ is the number of times one of the plurality of terms t is sampled from k,
$n_{.|k,-i}$ s the total number of entities generated from aspect k,
β is a Dirichlet smoothing parameter
υ is a vocabulary of terms.

9. The method of claim 6 where the probability that a given entity e can be associated with a given term t, p(e|t), is calculated as follows:

$$p(e\mid t) = p(e,t)/p(t) = \sum_k p(e)p(k\mid e)p(t\mid k)/p(t)$$

where p(t) is a reduction in entropy associated with the presence of term t.

10. The method of claim 9 where p(t) is calculated as follows:

$$p(t) = \sum_k \sum_e p(e)p(k\mid e)p(t\mid k)$$

where $p(e)=1/|\epsilon|$ is assumed to be the same for all entities.

11. The method of claim 1 where each of the second set of probabilities is p(t|k), determined using a term-aspect distribution as follows:

$$\Phi:\{\phi_{kt}=p(t\mid k)\forall_k \epsilon K, t\epsilon\upsilon\}$$

where $\Phi$ is a term-aspect distribution for all terms and aspects, $\phi_{kt}$ is a term-aspect distribution for a particular term t and aspect k, K is the plurality of aspects;

$\upsilon$ is a vocabulary of terms.

12. The method of claim 1 wherein the at least a subset of a plurality of entities comprises less than all of the plurality of entities.

13. The method of claim 1 wherein the descriptive data is retrieved from the website.

14. The method of claim 1 wherein the descriptive data is retrieved from a data source separate from the website.

15. A computing device comprising:
a processor;
a storage medium for tangibly storing thereon program logic for execution by the processor, the program logic comprising:
descriptive data retrieving logic executed by the processor for retrieving descriptive data relating to at least a subset of a plurality of entities on a website, the descriptive data comprising a plurality of descriptive data entries, each descriptive data entry relating to a respective one of the subset of the plurality of entities;
endorsement data retrieving logic executed by the processor for retrieving from the website, endorsement data relating to the plurality of entities, the endorsement data comprising a plurality of endorsements, each endorsement relating to a respective one of the plurality of entities and a respective one of a plurality of users;
entity-aspect determination logic executed by the processor for determining based on the descriptive data and the endorsement data, a first set of probabilities, each of the first set of probabilities reflecting a probability that a respective one of the plurality of endorsements is attributable to a respective one of a plurality of aspects determined from a sampling of a respective aspect value at an assigned term-slot, each of the plurality of aspects representing a cluster of entities;
term-aspect determination logic executed by the processor for determining, based on the descriptive data and the endorsement data, a second set of probabilities, each of the second set of probabilities reflecting a probability that a respective one of a plurality of terms is attributable to a respective one of the plurality of aspects;
tag selection logic executed by the processor for selecting based on the first set of probabilities and the second set of probabilities, for each entity, a respective subset of the plurality of terms that are most probably associated with the respective entity; and
tag generation logic executed by the processor for generating, for each entity, based on the respective subset of the plurality of terms that are most probably associated with the respective entity, a respective set of tags, each tag reflecting one of the subset of the plurality of terms.

16. The computing device of claim 15 further comprising:
determination logic executed by the processor for determining, for each of the at least a subset of the plurality of entities, a frequency of each of the respective subset of terms in the respective descriptive data entries for the respective entity, wherein the terms having the highest frequency are selected.

17. The computing device of claim 15 further comprising:
communication logic executed by the processor for transmitting, over the network, for each of the plurality of entities, the respective set of tags to the website; and
update logic executed by the processor for causing the website to update each of the plurality of entities with the respective set of tags relating to the entity.

18. The computing device of claim 15, further comprising:
determination logic executed by the processor for determining an assignment of each endorsement to an aspect using a collapsed Gibbs sampling method, where collapsed Gibbs sampling method uses the equation:

$$P(y_i = k\mid e_i = l, e_{-i}, y_{-1}) \propto \frac{n_{k\mid u,-i}+\alpha'}{|\epsilon(u)|+\alpha'|K|} \times \frac{n_{e\mid k,-i}+\beta'}{n_{\cdot\mid k,i}+\beta'|\epsilon|}$$

where $n_{k\mid u,-i}$ is the number of times aspect k is observed for user u, $n_{e\mid k,-i}$ is the number of times entity e is sampled from aspect k, $|\epsilon(u)|$ is number of entities endorsed by user u, and $n_{\cdot\mid k,-i}$ is the total number of entities generated from aspect k, such that the above quantities are computed over all endorsement-slots except the $i^{th}$ one.

19. The computing device of claim 15,
where each of the first set of probabilities is $\theta_{ek}=p(k|e)$, calculated as follows for each of the plurality of aspects k and each of the plurality of entities e:

$$\theta_{ek} = p(k\mid e) = \frac{p(e,k)}{p(e)} \propto \sum_{u\epsilon U} p(u)p(k\mid u)p(e\mid k)$$

where p(u) is the probability that a user u makes an endorsement; and where each of the second set of probabilities is p(t|k), determined using a term-aspect distribution as follows:

$$\Phi:\{\phi_{kt}=p(t\mid k)\forall_k \epsilon K, t\epsilon\upsilon\}$$

where $\Phi$ is a term-aspect distribution for all terms and aspects, $\phi_{kt}$ is a term-aspect distribution for a particular term t and aspect k, K is the plurality of aspects;

υ is a vocabulary of terms.

20. A non-transitory computer-readable storage media for tangibly storing thereon computer readable instructions, that when executed by a processor, perform a method comprising:

retrieving descriptive data relating to at least a subset of a plurality of entities on a web site, the descriptive data comprising a plurality of descriptive data entries, each descriptive data entry relating to a respective one of the subset of the plurality of entities;

retrieving from the website, endorsement data relating to the plurality of entities, the endorsement data comprising a plurality of endorsements, each endorsement relating to a respective one of the plurality of entities and a respective one of a plurality of users;

determining based on the descriptive data and the endorsement data, a first set of probabilities, each of the first set of probabilities reflecting a probability that a respective one of the plurality of endorsements is attributable to a respective one of a plurality of aspects determined from a sampling of a respective aspect value at an assigned term-slot, each of the plurality of aspects representing a cluster of entities;

determining, based on the descriptive data and the endorsement data, a second set of probabilities, each of the second set of probabilities reflecting a probability that a respective one of a plurality of terms is attributable to a respective one of the plurality of aspects;

selecting based on the first set of probabilities and the second set of probabilities, for each entity, a respective subset of the plurality of terms that are most probably associated with the respective entity; and generating, for each entity, based on the respective subset of the plurality of terms that are most probably associated with the respective entity, a respective set of tags, each tag reflecting one of the subset of the plurality of terms.

* * * * *